(12) United States Patent
Siblik et al.

(10) Patent No.: US 8,955,662 B1
(45) Date of Patent: Feb. 17, 2015

(54) REPLACEMENT ROLLER SUPPORT BRACKET

(71) Applicants: Allen D Siblik, Spring Grove, IL (US); Stephen J Gorshe, Bellaire, OH (US)

(72) Inventors: Allen D Siblik, Spring Grove, IL (US); Stephen J Gorshe, Bellaire, OH (US)

(*) Notice: Subject to any disclaimer, the term of this patent is extended or adjusted under 35 U.S.C. 154(b) by 0 days.

(21) Appl. No.: 13/834,136

(22) Filed: Mar. 15, 2013

(51) Int. Cl.
*B65G 13/00* (2006.01)
*B65G 13/11* (2006.01)

(52) U.S. Cl.
CPC .................... *B65G 13/11* (2013.01)
USPC ..................... 193/35 R; 198/828

(58) Field of Classification Search
CPC .............................................. B65G 39/12
USPC .......... 193/35 R, 37; 198/806, 808, 823–830, 198/842; 474/199, 198; 403/3, 300, 310, 403/312, 313
See application file for complete search history.

(56) References Cited

U.S. PATENT DOCUMENTS

| 1,883,422 | A | * | 10/1932 | Strong | 198/501 |
| 5,988,361 | A | * | 11/1999 | Giacomin et al. | 198/830 |
| 8,028,824 | B2 | * | 10/2011 | Gorshe | 198/842 |
| 8,210,344 | B2 | * | 7/2012 | Croftcheck | 198/830 |

FOREIGN PATENT DOCUMENTS

GB   2109327 A  *  6/1983  ............. B65G 39/12

* cited by examiner

*Primary Examiner* — William R Harp
(74) *Attorney, Agent, or Firm* — Patnaude & Videbeck

(57) ABSTRACT

A replacement roller support bracket allows a quick way of replacing damaged roller support brackets of a conveyor belt roller support system. The replacement roller support bracket includes an upper bracket assembly and a lower plate. The upper bracket assembly includes end walls, with recesses designed to receive a mounting flange of a roller, the end walls connected to side walls. The end walls also include remnant locators, extending downward, that locate a damaged roller support remnant, and guide the upper bracket down towards the system base during installation of the replacement bracket. The upper bracket and lower plate also include jaws with cut-outs corresponding to the shape of the system base, which can be of a variety of shapes, such as pipe-shaped or angle iron shaped. The cut-outs include teeth that engage the system base, that secure a tight fit around the system base and, along with the remnant locators, prevent bracket rotation.

20 Claims, 5 Drawing Sheets

REPLACEMENT ROLLER SUPPORT BRACKET

BACKGROUND OF THE INVENTION

1. Field of the Invention

The present invention relates generally to a conveyor belt roller support system and more particularly, to a replacement roller support bracket for repairing a conveyor roller support system in an efficient and easy way.

2. Description of the Prior Art

Conveyor belt systems are used in a wide variety of industries, such as the mining industry, food industry, and packaging industry, to transport materials from one location to another. Generally, rubber conveyor belts rest on a series of idler rollers, that are mounted to roller supports formed integrally or welded to a base. Depending on the type of conveyor belt, there may be a V shaped roller array incorporating three support brackets or a horizontal roller array between two wing roller supports and two intermediate supports. In the mining industry, the wear and tear of transporting large, heavy quantities of material leads to damage of the roller supports, more often the interior or center roller support. Replacing the roller support brackets generally requires removing the whole conveyor belt roller support frame, which requires substantial time due to its size and weight of the roller support system.

U.S. Pat. No. 8,210,344 discloses a frame adapter assembly for repair of a belt conveyor assembly that includes a frame adapter body having a top surface and a bottom bearing surface for at least partially contacting a surface of the belt conveyor frame, at least one bracket extending from the top surface of the frame adapter body for operatively engaging at least a portion of a shaft of one roller, and at least one attachment arrangement for removably or permanently attaching the frame adapter assembly to a portion of the existing belt conveyor frame. The frame adapter assembly disclosed in the '344 patent is bulky and includes unnecessary parts.

The prior art to date does not disclose a simple replacement roller support bracket that uses only the necessary amount of material to provide adequate support and alignment. Furthermore, the prior art to date does not disclose a cost and time efficient replacement roller support bracket that is easy to install. None of the prior art can be combined in this way to suggest these necessary modifications. There is no teaching, suggestion, or motivation that would have enabled a person of ordinary skill in the art to modify any prior art system to incorporate all of these features.

It is a primary object of the present invention to provide a replacement roller support bracket that is efficient and easy to install.

It is another object of the present invention to provide a replacement roller support bracket that eliminates unnecessary material while providing a snug fit and proper alignment of the conveyor rollers.

SUMMARY OF THE INVENTION

The replacement roller support bracket of the present invention is adapted to replace an existing damaged roller support assembly that is integrally formed with the system base of a conveyor belt roller support system. The replacement roller support bracket can be used to replace damaged roller supports in a variety of conveyor belt roller support systems, such as two and three aligned roller systems using a pipe shaped system base or an angle iron system base. The damaged roller support does not have to be fully removed from the system base. A substantial remnant of the damaged roller support can be left on the system base, which will aid in guiding the replacement roller support bracket during installation, as will be described.

The replacement roller support bracket of the present invention includes an upper roller support bracket assembly and a lower plate. The upper roller support bracket assembly in an embodiment includes two spaced-apart end walls welded to two side walls. The top edges of the side walls are bent over prior to welding to form top walls. The end walls include recesses adapted to receive mounting portions of idler rollers. The end walls also include remnant locators that extend downward and aid in locating the replacement bracket on the remnant of a damaged roller support, and guiding the upper roller support bracket assembly onto the system base during installation. Located behind and between the end walls are two upper jaws that include lateral tabs that slide and lock into slots located in the side walls. The upper jaws correspond with lower jaws located on the lower plate. The upper and lower jaws include cut outs that generally correspond to the shape of the system base. The cut outs, in both the upper and lower jaws, include teeth that are configured to engage and grasp the system base, allowing a tight fit around the system base and preventing rotation of the replacement bracket.

The lower plate also includes a plurality of apertures designed to engage a corresponding plurality of threaded bolts welded to the side walls of the upper replacement roller support bracket assembly. After alignment and installation, the upper roller support bracket assembly and the lower plate are securely tightened around the system base by tightening washers and nuts to the ends of the threaded bolts.

BRIEF DESCRIPTION OF THE DRAWINGS

The features of the present invention which are believed to be novel are set forth with particularity in the appended claims. The invention may best be understood from the following detailed description of a currently preferred embodiment and modifications thereof taken in conjunction with the accompanying drawings wherein like numerals refer to like parts and in which:

DETAILED DESCRIPTION OF THE ILLUSTRATED EMBODIMENTS

Figure 1:
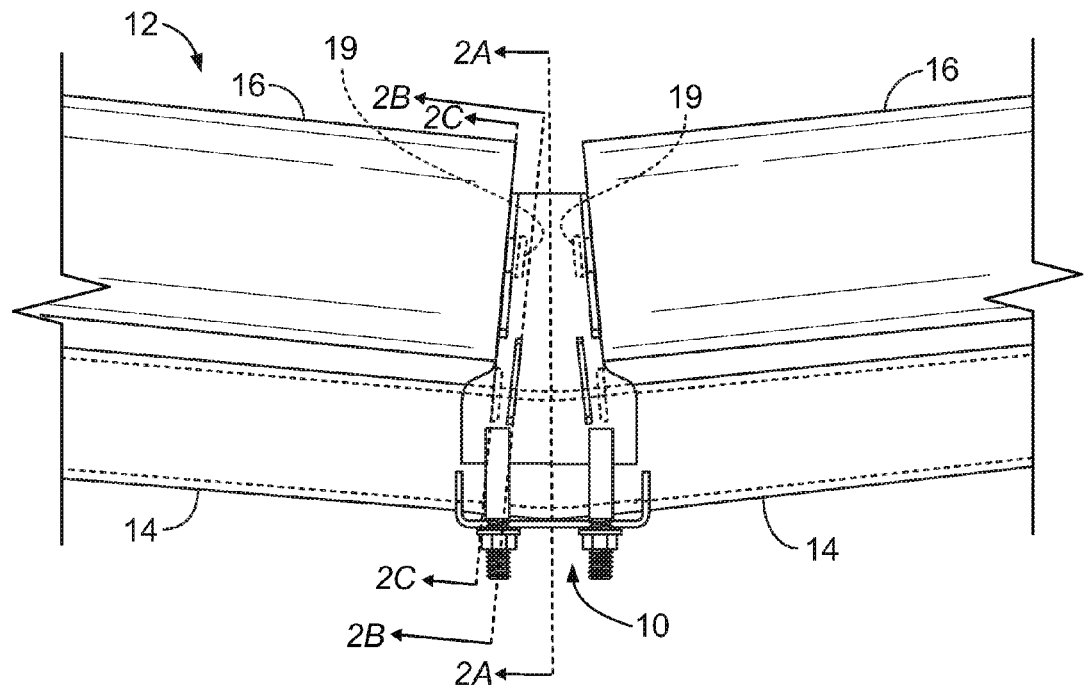
FIG. 1 is a side view of a first type of a two-roller conveyor belt roller support system with a first embodiment of a replacement roller support bracket of the present invention.
Figure 2A:
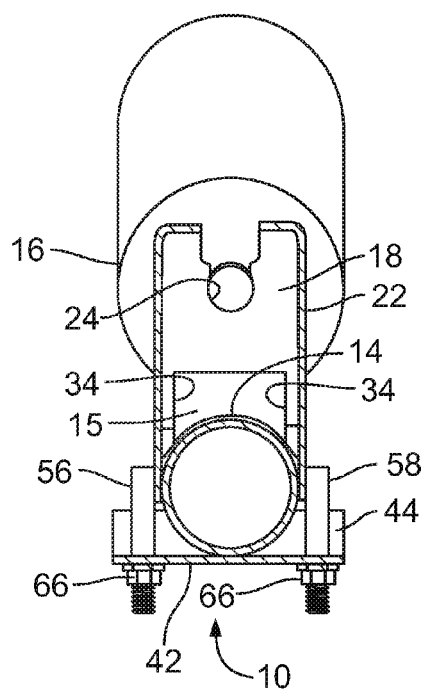
FIG. 2a is an enlarged cross sectional view, taken at line 2a of FIG. 1, of the connection of the roller support shaft to an embodiment of the replacement roller support bracket of the present invention.
Figure 2B:
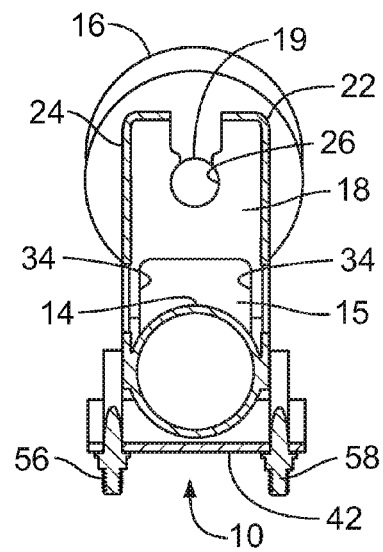
FIG. 2b is an enlarged cross sectional view, taken at line 2b of FIG. 1, of the roller, system base, and replacement roller support bracket of the conveyor belt roller support system.

A side view of an embodiment of a replacement roller support bracket 10 of the present invention is shown in FIG. 1, mounted onto the base 14 of a conveyor belt roller support 12. Idler rollers 16 are mounted to each side of the replacement roller support bracket 10. The replacement roller support bracket 10 can be used in a variety of conveyor belt roller support systems, such as two and three roller systems using a pipe shaped system base or an angle iron system base. Side views of the replacement roller support bracket 10 are shown, taken at cross section lines 2a, 2b, and 2c of FIG. 1, in FIG. 2a, FIG. 2b, and FIG. 2c, respectively.

Figures 2C, 3:
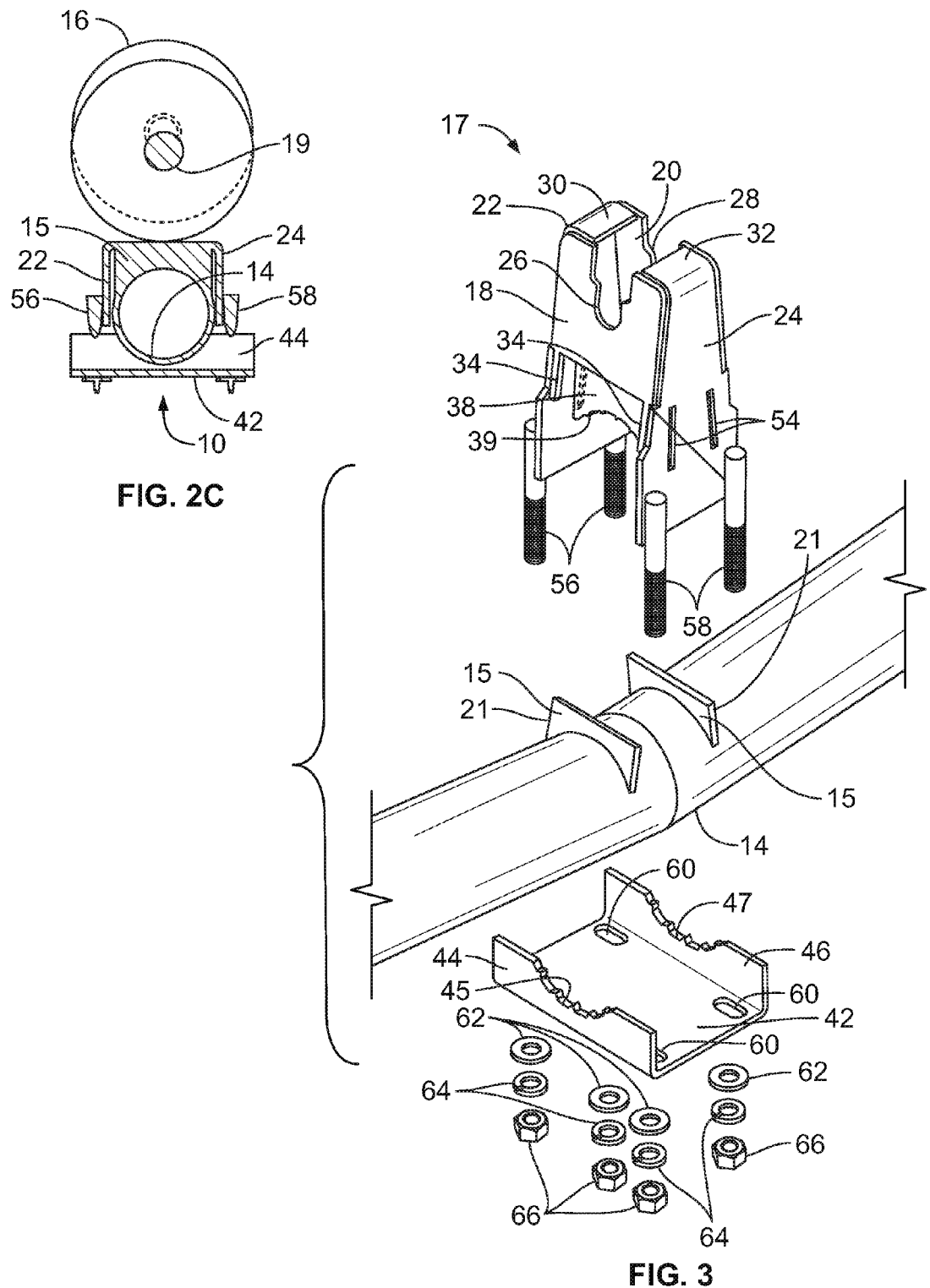
FIG. 2c is an enlarged cross-sectional view, taken at line 2c of FIG. 1.
FIG. 3 is an exploded, perspective view of an embodiment of the replacement roller support bracket of the present invention, showing the upper replacement roller support bracket in its assembled form and two differing lower support brackets.

The replacement roller support bracket 10 is shown in an exploded perspective view in FIG. 3 which depicts how the support bracket 10 is installed onto the base 14 of the conveyor belt roller support 12. The replacement roller support bracket 10 includes an upper roller support bracket assembly generally indicated at 17, and a lower plate generally indicated at 42. The upper roller support bracket 17 includes two end walls 18, 20 welded to two side walls 22, 24. The distance between end walls 18, 20 is substantially the same as the distance between the system roller support remnants 15 of the damaged roller support assembly being replaced, which remnants 15 are left attached to the systems base 14 after the remainder of the damaged support bracket has been removed. The top edges of the side walls 22, 24 are bent over prior to welding to form the top walls 30, 32. The end walls 18, 20 each include respective recesses 26, 28 designed to receive a flanged mounting portion 19 of idler rollers 16. To aid in alignment, the end walls 18, 20 also include a pair of remnant locators 34-34, 36-36, respectively, that extend downward from each end wall 18, 20.

Figure 8:
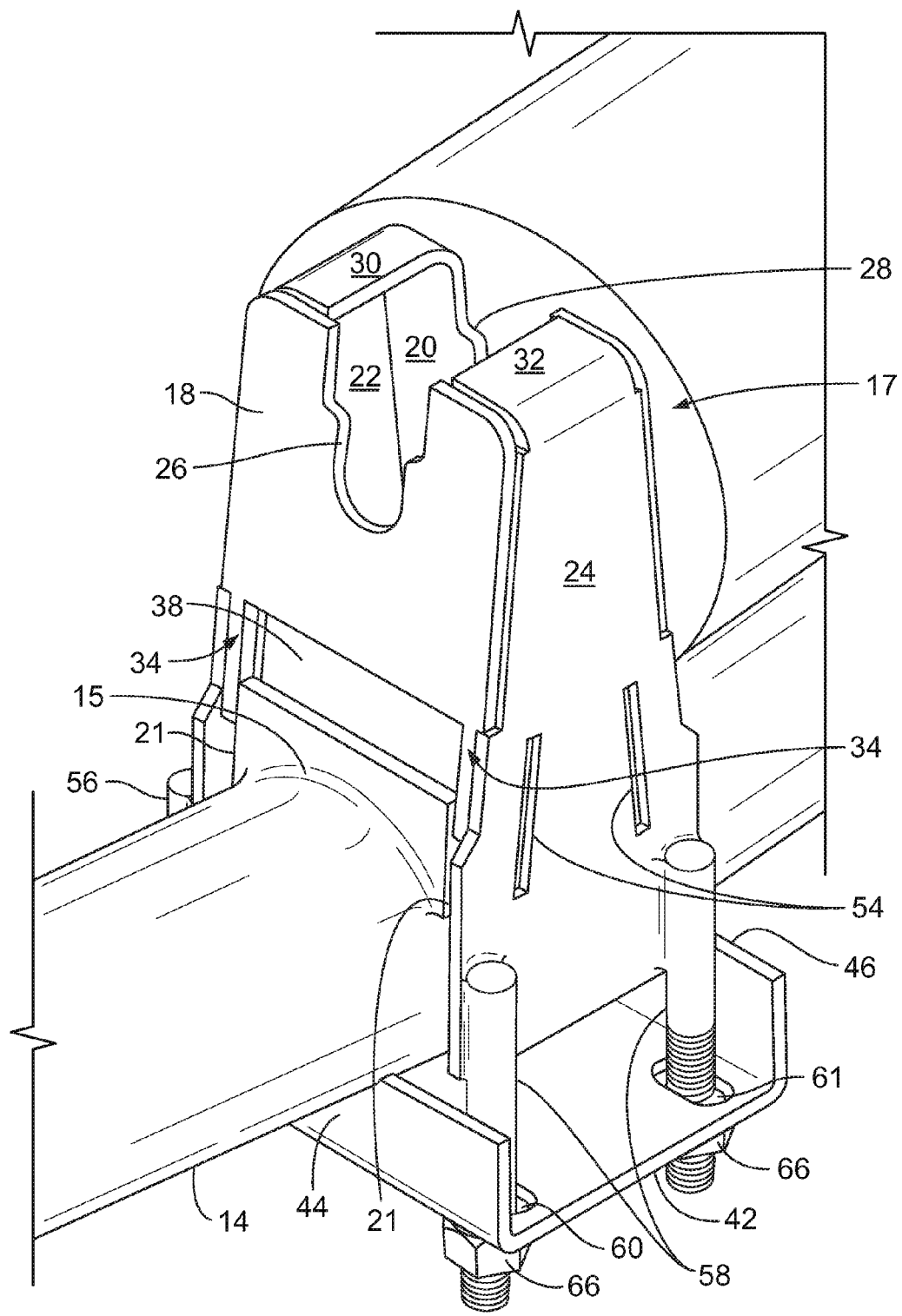
FIG. 8 is an enlarged perspective view of an embodiment of the replacement roller support bracket of the present invention assembled on a conveyor belt roller support system, showing the upper bracket support assembly and the lower plate.

The remnant locators 34, 36 aid in guiding the upper bracket roller support assembly 17 during installation by locating the support bracket assembly 10 in alignment with the original, damaged system roller support remnants 15 (FIG. 8) to be replaced. The original system roller support remnants 15-15 are preferably not completely removed, although they may be if sufficiently damaged. If a substantial remnant 15 of the original system roller supports is left on the system base 14, as is shown in FIG. 8, they may be trimmed laterally engage the remnant locators 34-34, 36-36 and establish the longitudinal location of the remnants 15-15 of the original, damaged system roller supports, thereby properly locating the upper roller support bracket assembly 17 onto the base 14. The remnant locators 34, 36 also establish the radial location of bracket assembly 17, and thereby help prevent bracket rotation. The remnants 15-15 may have relatively smooth lateral vertical surfaces 21-21 to allow the remnant locators 34, 36 to slide over the lateral vertical surfaces 21-21.

Figure 4:
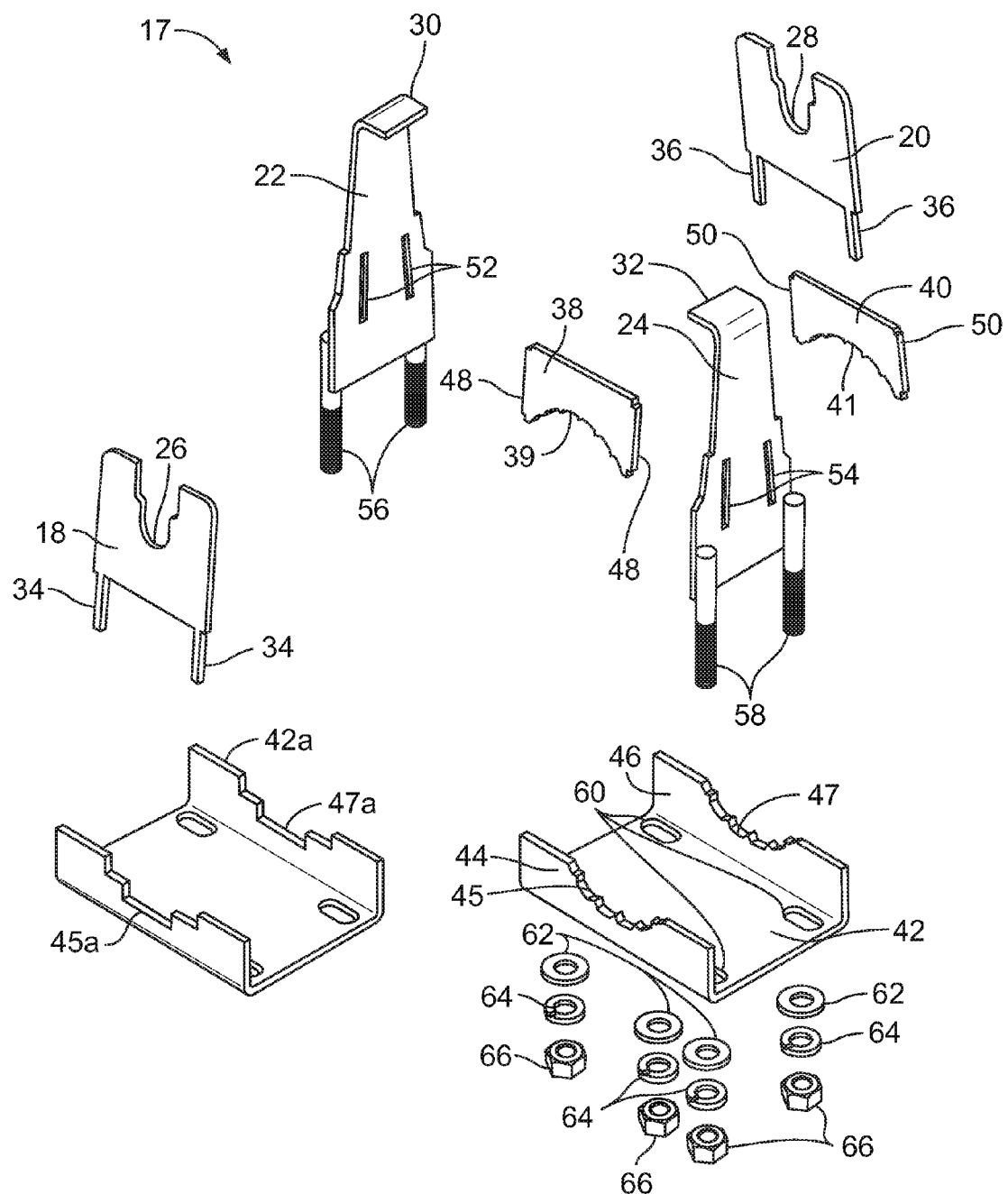
FIG. 4 is an exploded, perspective view of an embodiment of the replacement roller support bracket of the present invention showing an exploded detail view of the parts making up the upper replacement roller support bracket assembly.
Figure 5:
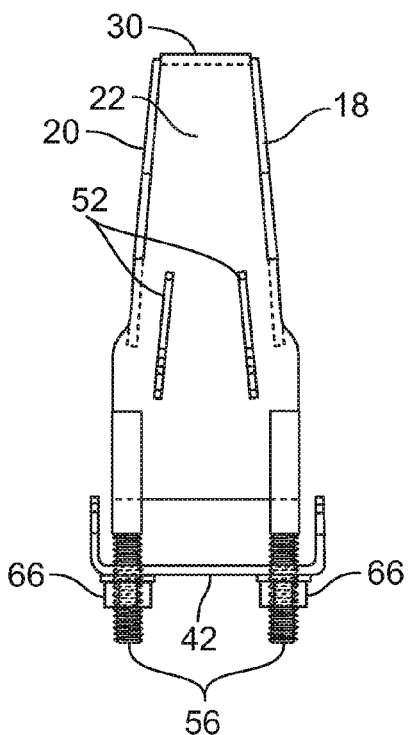
FIG. 5 is a side view of an embodiment of the replacement roller support bracket of the present invention.
Figure 6:
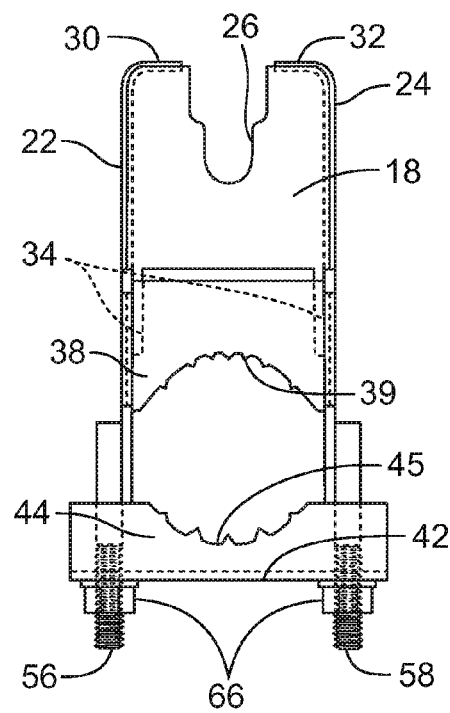
FIG. 6 is a front view of an embodiment of the replacement roller support bracket of the present invention.
Figure 7:
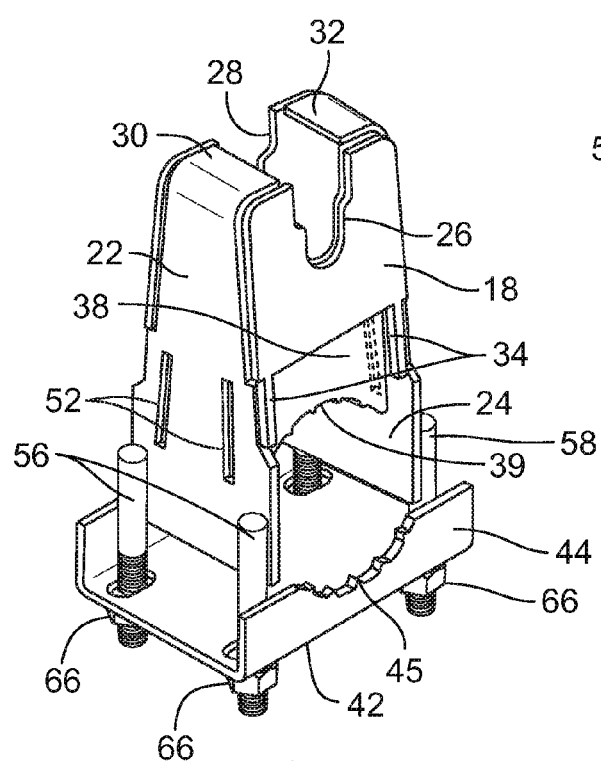
FIG. 7 is a perspective view of an embodiment of the replacement roller support bracket of the present invention.

Located behind end walls 18, 20 and remnant locators 34, 36 are upper jaws 38, 40 (FIGS. 3, 4). The upper jaws 38, 40, which include lateral tabs 48-48, 50-50, respectively, that slide and lock into slots 52, 54 located in side walls 22, 24 shown in FIG. 4, ensure that there is no interference between the original system roller support remnants 15 and the upper jaws 38-40. The lower plate 42 includes corresponding lower jaws 44, 46. The upper jaws 38, 40 and lower jaws 44, 46 include cut outs 39, 41 and 45, 47, respectively, that correspond substantially to the shape of the base 14. The cut outs 39, 41, 45, 47, in both the upper jaws 38, 40 and the lower jaws 44, 46, include teeth that are designed to engage and grasp the base 14, allowing a tight fit around the system base 14 and preventing bracket rotation after installation. The embodiment shown in the figures depicts cut outs 39, 41, 45, 47 that are generally semi-circular in shape and are designed to grasp a pipe-shaped base. However, the cut outs 39, 41, 45, 47 can be cut to the shape of any base, such as an angle iron base, discussed in more detail below.

In the illustrated embodiment, a plurality of threaded bolts 56, 58 are welded to the bottom of the bracket side walls 22, 24 and engage the lower plate 42 through a plurality of apertures 60 (FIGS. 3, 8), upon installation. After alignment and installation, the upper roller support bracket assembly 17 and the lower plate 42 are securely tightened around the base 14 by rotating nuts 66, causing the teeth in the upper jaws 38, 40 and the lower jaws 44, 46 to engage and grasp the base 14. The threaded bolts 56, 58 are tightly secured to the lower plate 42 using washers 62, lock washers 64, and nuts 66. An enlarged perspective view of the replacement roller support bracket 10, completely assembled onto the system base 14, is shown in FIG. 8.

A modification of the lower support bracket is shown at 42a having rectangular cutouts 45a, 47a for retaining the bottom of angle iron frame supports (not shown) rather than the tubular support shown in FIGS. 1-3.

Prior to installing replacement roller support bracket 10 on system base 14, damaged support brackets are removed, preferably leaving remnants 15-15 attached to base 14, such as by welding as shown in FIG. 8. The installer observes the quality of smoothness of vertical side faces 21 of each remnant 14. If the faces 21 are not substantially smooth, the user smoothes faces 21 by grinding, polishing, or other methods as are known in the art. Next, upper bracket roller support assembly 17 is assembled as shown in FIGS. 3 and 8, and lowered over the remnants 15, as shown in FIG. 3. The end walls 18, 20 are in vertical alignment with each respective remnant 15 as upper bracket roller support assembly 17 is moved into place, and remnant locators 34, 36 preferably engage and slide down along vertical lateral faces 21 of each respective remnant 15, guiding bracket 17 into its proper position over system base 14. As bracket 10 is lowered into position, upper jaws 38, 40 contact system base 14, and the downward movement of bracket 10 is halted. As stated previously, upper jaws 38, 40 are located inside of end walls 18, 20 of bracket 10, and positioned such that upper jaws 38, 40 do not interfere with the contact between remnant locators 34, 36 and faces 21 of remnants 15 as bracket 10 is lowered into position.

Upper jaws 38-40 are slidable in slots 52-52, 54-54, respectively. After the proper positioning of each recess 26, 28 is fitted or otherwise achieved, the upper jaws are welded in place. This assures the placement of those recesses 28-28 exactly where the previous support bracket recesses were located. This properly aligns the idler rollers 16-16 and their respective mounting recesses 26-28.

After upper jaws 38, 40 contact system base 14, lower plate 42 is raised into position where threaded bolts 56, 58 extend through apertures 60 in the lower plate. Washers 62, lock washers 64 and nuts 66 are then installed and tightened until upper jaws 38, 40 and lower jaws 44, 46 tightly engage and grasp system base 14 such that bracket 17 cannot move laterally or rotationally relative to system base 14. Also, the remnant locators 34, 36 remain in contact with lateral faces 21 of remnants 15, further preventing rotation of replacement roller support bracket 10 about system base 14. The present invention utilizes the edges of the respective jaws to locate the support bracket assembly, thus avoiding use of any horizontally oriented base plate in the upper bracket.

The present invention has been described and illustrated with two end walls 18, 20, with each end wall having a recess 26, 28. In another embodiment of the invention, the bracket 10 could comprise a single end wall and a single recess in that end wall. This embodiment would be used to replace an end bracket on one of the outer rollers of the conveyor system.

The foregoing description of an illustrated embodiment of the invention including a modification of a base plate has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A replacement roller support bracket assembly for a conveyor roller support, said support bracket assembly comprising:
    an upper bracket having at least a first end wall including a roller mounting shaft recess thereon and opposed edges:
    a pair of spatially related side walls generally perpendicular to and in communication with said side wall edges;
    said spatially related side walls each having a substantially vertical first slot therein;
    a first upper jaw member extending between and slidably mounted in said slots at said spatially related side walls thereof;
    the vertical slidability of said jaw member providing for precise correct positioning of said roller mounting shaft recess.

2. The replacement roller support bracket assembly as defined in claim 1 further including:
    a base member including a pair of spatially related lower jaws, said first upper jaw member and said lower jaws including at least one semicircular cut-out on each.

3. The replacement roller support assembly as defined in claim 2 wherein said first upper jaw cut-out has teeth thereon.

4. The replacement roller support assembly as defined in claim 2 wherein said upper jaw circular cut-out includes teeth thereon.

5. The replacement roller support assembly as defined in claim 2 wherein edges of said upper and lower jaws provide the contact and stabilized mounting between the replacement support bracket and an original equipment support bracket frame.

6. The replacement roller support bracket as defined in claim 2 further including a plurality of fasteners selectably releasably joining said upper bracket and said base member.

7. The replacement roller support bracket assembly as defined in claim 1 further including:
    a base member including a pair of spatially related lower jaws, each of said lower jaws having a rectangular cut-out thereon.

8. The replacement roller support bracket assembly as defined in claim 1 wherein:
    said upper bracket includes a second end wall spatially positioned from said first end wall between and in communication with said pair of spatially related side walls,
    said second end wall including a roller mounting shaft recess thereon.

9. The replacement roller support assembly as defined in claim 8 wherein end second side wall further includes a pair of spaced apart remnant locators depending from said end wall.

10. The replacement roller support assembly as defined in claim 1 wherein each said side wall includes a second substantially vertical slot therein spatially related to each said first slot, and further including,
    a second upper jaw member extending between and slidably mounted in and between said second slots.

11. The replacement roller support assembly as defined in claim 10 wherein said second upper jaw member includes a semicircular cut-out thereon.

12. The replacement roller support assembly as defined in claim 1 wherein said upper bracket end wall further includes a pair of spaced apart remnant locators depending from said end wall.

13. The replacement roller support bracket assembly for a conveyor roller support as defined in claim 1 wherein said first upper saw member may, after such precise correct positioning, be fixedly mounted in said slots.

14. A replacement roller support bracket assembly for a conveyor roller support, said support bracket assembly comprising:
    an upper bracket having a pair of spaced apart end walls, each said end wall including a roller mounting shaft recess thereon and opposed edges:
    a pair of spatially related side walls generally perpendicular to and in communication with said end wall edges,
    said side walls each having a pair of substantially vertical slots therein,
    a pair of upper jaw members extending between and slidably mounted in respective ones of said slots at said spatially related side walls thereof,
    the vertical slidability of said jaw member providing for precise correct positioning of said roller mounting shaft recesses, whereupon said jaw member may after such precise correct positioning be fixedly mounted in said slots.

15. The replacement roller support bracket assembly as defined in claim 14 further including:
    a base member including a pair of spatially related lower jaws, said upper jaws and said lower jaws including semicircular cut-outs on same.

16. The replacement roller support assembly as defined in claim 15 wherein said upper and lower jaw cut-outs have teeth thereon.

17. The replacement roller support assembly as defined in claim 15 wherein said upper bracket side walls each further includes a pair of spaced apart remnant locators depending therefrom.

18. The replacement roller support assembly as defined in claim 15 wherein edges of said upper and lower jaws provide the contact and stabilized mounting between the replacement support bracket and an original equipment support bracket frame.

19. The replacement roller support bracket as defined in claim 15 further including a plurality of fasteners selectably releaseably joining said upper bracket and said base member.

20. A replacement roller support bracket for a conveyor roller support, said support bracket assembly comprising:
    an upper bracket having a pair of spaced apart end walls, each said side wall including a roller mounting shaft recess thereon and opposed edges;
    a pair of spatially related side walls generally perpendicular to and in communication with said end wall edges;

said spatially related side walls each having a pair of substantially vertical slots therein;
a pair of upper jaw members extending between and slidably mounted in respective ones of said slots at said spatially related side walls thereof;
the vertical slidability of said jaw member providing for precise correct positioning of said roller mounting shaft recesses, whereupon said jaw member may after such precise correct positioning be fixedly mounted in said slots;
a base member including a pair of spatially related lower jaws extending upwardly therefrom, and
a plurality of fasteners selectably releaseably joining said upper bracket and said base member.

\* \* \* \* \*